United States Patent
Ueda

(10) Patent No.: US 6,353,545 B1
(45) Date of Patent: Mar. 5, 2002

(54) INVERTER APPARATUS WITH ACTIVE CURRENT LIMITING AND SMOOTHING CIRCUIT

(75) Inventor: Hidefumi Ueda, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 09/856,492

(22) PCT Filed: Dec. 22, 1999

(86) PCT No.: PCT/JP99/07254

§ 371 Date: Jun. 12, 2001

§ 102(e) Date: Jun. 12, 2001

(87) PCT Pub. No.: WO00/41293

PCT Pub. Date: Jul. 13, 2000

(30) Foreign Application Priority Data

Dec. 28, 1998 (JP) ............................................. 10/373694

(51) Int. Cl.⁷ ............................. H02M 1/12; H02M 1/14
(52) U.S. Cl. ........................ 363/40; 363/56.03; 323/908
(58) Field of Search ................................. 323/901, 908; 363/39, 40, 49, 50, 51, 55

(56) References Cited

U.S. PATENT DOCUMENTS

| | | | |
|---|---|---|---|
| 4,321,447 A | * | 3/1982 | Lamb ...................... 219/10.55 |
| 4,982,306 A | * | 1/1991 | Koroncai et al. .............. 361/58 |
| 5,412,557 A | * | 5/1995 | Lauw ........................... 363/37 |
| 5,418,707 A | * | 5/1995 | Shimer et al. ................ 363/65 |
| 5,483,142 A | | 1/1996 | Skibinski et al. ............. 363/87 |

FOREIGN PATENT DOCUMENTS

| | | |
|---|---|---|
| JP | 60-139127 | 7/1985 |
| JP | 7-59359 | 3/1995 |

* cited by examiner

*Primary Examiner*—Bao Q. Vu
(74) *Attorney, Agent, or Firm*—Armstrong, Westerman & Hattori, LLP

(57) ABSTRACT

An inverter apparatus is provided such that it can limit the inrush current to a smoothing capacitor of a converter at the instant of connection to AC power line. The inverter apparatus comprises a converter (3); an inverter (4); a first smoothing capacitor (12) between positive and negative buses that connect the output of the converter and the inputs of the inverter; a first resistor (14) connected in either the positive or negative bus between the first smoothing capacitors (12) and the converter (3); and the first switch means (16) connected in parallel with the first resistor. A second smoothing capacitor (11) connected in series with a parallel circuit of a second resistor (13) and second switch means (15) is connected between the positive and negative buses between the converter (3) and the switch means (16).

1 Claim, 5 Drawing Sheets

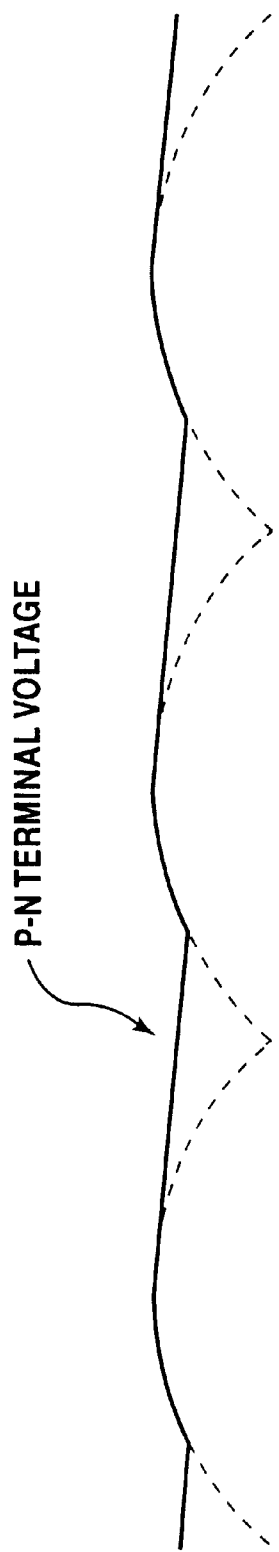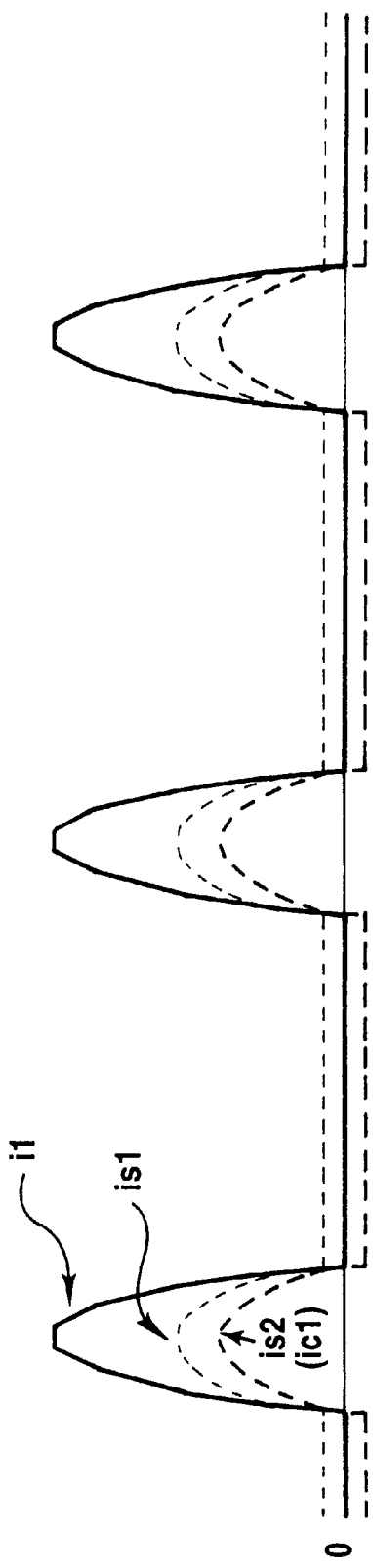

INVERTER APPARATUS WITH ACTIVE CURRENT LIMITING AND SMOOTHING CIRCUIT

TECHNICAL FIELD

The present invention relates to an inverter apparatus provided with a converter and, in particular, to an inverter apparatus provided with an inrush current limiting device for limiting an inrush current into a smoothing capacitor of a converter at the instant of connection to a commercial AC power line.

BACKGROUND ART

FIG. 4 shows a configuration of an inverter apparatus provided with an inrush current limiting device as a prior art described in Japanese Unexamined Patent Publication No. Hei-9-19154.

In FIG. 4, 101 denotes a three phase power supply, 102 denotes a power failure detection circuit, 103 denotes a converter, 104 denotes an inverter, 105 denotes a motor, 106 denotes a control circuit, 107 and 108 denote bypass contacts, r and R denote current limiting resistors, C1 and C2 denote smoothing capacitors, P denotes a positive bus, and N denotes a negative bus.

Now, operations according to the configuration of FIG. 4 will be described. As shown in FIG. 4, a series circuit comprising the current limiting resistor r and the smoothing capacitor C1 is connected between the positive bus P and the negative bus N on the output end of the converter 103 and the bypass contact 107 is connected in parallel with the current limiting resistor r. A resistance value of the current limiting resistor r is determined by setting a charging constant of the smoothing capacitor C1 and a wattage (instantaneous withstanding capacity) is determined by a electrostatic capacity of the smoothing capacitor C1. The opening and closing timing of the bypass contact 107 is controlled by an opening/closing control signal to be supplied from the power failure detection circuit 102. Similar to the above, a series circuit comprising the current limiting resistor R and the smoothing capacitor C2 is also connected between the positive bus P and the negative bus N on the output end, the bypass contact 108 is connected in parallel with the current limiting resistor R, and similar to the bypass contact 107, the opening and closing timing of the bypass contact 108 is also controlled by an opening/closing control signal to be supplied from the power failure detection circuit 102.

In the above configuration, both bypass contacts 107 and 108 are opened at the instant of connection to the power line and as an output current from the converter 103, a charging current flows through a route from the output terminal of the converter 103, the positive bus P, the current limiting resistors r and R, the smoothing capacitors C1 and C2, the negative bus N to the negative output of the converter 103. After completion of the charging of the smoothing capacitors C1 and C2, the bypass contacts 107 and 108 are closed and the current limiting resistors r and R are bypassed, and hereafter the charging and discharging of the smoothing capacitors C1 and C2 are carried out via the bypass contacts 107 and 108, respectively.

In this configuration, a charge/discharge current of the smoothing capacitor Cl connected to the bypass contact 107 is the only current which flows through the bypass contact 107 and similarly, a charge/discharge current of the smoothing capacitor C2 connected to the bypass contact 108 is the only current which flows through the bypass contact 108.

Incidentally, in the above configuration shown in FIG. 4, a rectified DC high voltage is to be impressed between positive and negative terminals of the transistor of the inverter 104 in an instant by the converter 103. At this time, due to the stray capacitance existing between terminals of each transistor (herein, IGBTs are tentatively used) as shown in FIG. 5, a voltage generates between gate and emitter of both upper and lower IGBTs. And, as a result, both upper and lower IGBTs are turned on and a short circuit current generates and there is a problem in that the IGBTs brake.

Furthermore, at the time of regenerative operation of the inverter apparatus, in this case, the energy returns from the motor 105 to the side of the inverter apparatus, however if the bypass contact malfunctions and is turned off during the regeneration, a regenerative current then flows into the smoothing capacitor via the current limiting resistor, therefore a high voltage generates between the positive and negative terminals of the inverter 104 in an instant and exceeds the voltage tolerance of the IGBTs of the inverter 104 and diodes of the converter 103 and there is a problem in that these elements brake.

DISCLOSURE OF THE INVENTION

In order to solve the above described problems, according to the present invention, as described in Claim 1, an inverter apparatus comprises: a converter 3 for converting AC power to DC power; an inverter 4 for inverting the converted DC power to AC power having a predetermined frequency; a first smoothing capacitor 12 between positive and negative buses that connect the output terminal of the converter and the input terminal of the inverter; a first resistor 14 connected in either the positive or negative bus between the converter 3 and the first smoothing capacitor 12; and a first switch means 16 connected in parallel with the first resistor, wherein a second smoothing capacitor 11 connected in series with a parallel circuit comprising a second resistor 13 and a second switch means 15 connected in parallel with each other is connected between the positive and negative buses between the converter 3 and the first switch means 16.

In the inverter apparatus having the construction as set forth in Claim 1, since both the first switch device and the second switch device are open when the AC power line is connected, a charging current for the first smoothing capacitor which flows from the positive output terminal of the converter via the first resistor and the first smoothing capacitor to the negative output terminal of the converter and a charging current for the second smoothing capacitor which flows from the positive output terminal of the converter via the second resistor and the second smoothing capacitor to the negative output terminal of the converter generate. Then, when the charging for both first and second smoothing capacitors is completed, both first and second switch devices are closed and power outputting operation of the inverter is started. During this power outputting operation of the inverter, power corresponding to the power output is supplied from the commercial AC power line 1, and currents supplied from this commercial AC power line to the converter of the inverter apparatus respectively flow via the converter through the following three routes inside the inverter apparatus and then return via the converter to the commercial AC power line without change.

First, through the first route, the current flows to the positive terminal of the converter, the first switch device, the first smoothing capacitor, and the positive terminal of the converter (hereinafter, referred to as "route 1"), then through the second route, the current flows to the positive terminal of the converter, the second switch device, the second smoothing capacitor, and the negative terminal of the converter (hereinafter, referred to as "route 2"), and through the third route, the current flows to the positive terminal of the converter, the first switch device, semiconductor switching elements on the lower arm side of the inverter, a load, semiconductor switching elements on the lower arm side of the inverter apparatus, and the negative output terminal of the converter (hereinafter, referred to as "route 3"). Also, as a matter of course, the currents supplied from the commercial AC power line 1 are not consecutive currents, therefore, the energy charged in the first and second smoothing capacitors is discharged in a time zone where no current is supplied, so that the power outputting operation of the inverter is carried out. The reduced amount of the charged energy of the smoothing capacitors is recharged by a current supplied from the commercial AC power line. Such a charging/discharging operation to the smoothing capacitors is repeated at a frequency of two times the commercial frequency when the commercial power source employs a single phase input method or of six times the commercial frequency when the commercial power source employs a three-phase input method.

Then, when the energy charged in the first and second smoothing capacitors is discharged, a current route from the first smoothing capacitor, via the semiconductor switching elements on the upper arm side of the inverter, the load, the semiconductor switching elements on the lower arm side of the inverter, and returning to the first smoothing capacitor (hereinafter, referred to as "route 4") and a current route from the second smoothing capacitor via the second switch device, the first switch device, the semiconductor switching elements on the upper arm side of the inverter, the load, the semiconductor switching elements on the lower arm side of the inverter, and returning to the second smoothing capacitor (hereinafter, referred to as "route 5") generate.

Herein, the currents of the route 1 and route 2 are short in the conduction time, but are extremely great in the peak value, therefore, the effective values thereof become great, the current of the route 3 is short in the conduction time and is not great in the peak value, therefore, the effective value thereof become small, and the currents of the route 4 and route 5 are long in the conduction time, but are not great in the peak value, therefore the effective values thereof become intermediate values. Accordingly, the majority of the current which flows through the first switch device (the currents through the route 1, route 3, and route 5) is a charging current for the first smoothing capacitor and the whole current which flows through the second switch device (the currents through the route 2 and route 5) is a charge/discharge current of the smoothing capacitor 12.

Herein, when the output power of the inverter apparatus becomes large, it is necessary to increase the electrostatic capacity of the smoothing capacitor. By increasing the capacity of a smoothing capacitor to be increased as that of the second smoothing capacitor having the construction as described in Claim 1, due to the aforementioned effects, the current flowing through the first switch device increased little (since the majority of this current is the charging current for the first smoothing capacitor) and the increased capacity can be dealt with as a current flowing through the second switch device (that is a charge/discharge current of the second smoothing capacitor). Accordingly, even when the output power of the inverter apparatus becomes large, without increasing the rating current of the first switch device, that is, by the first and second small switch devices, an inrush current limiting device can be constructed.

Also, when the commercial AC power line is connected in the present construction, the first switch device is open, therefore, the charging current for the first smoothing capacitor is limited by the first resistor and, accordingly, the voltage between terminals of the first smoothing capacitor, that is, the voltage between positive and negative terminals of the inverter slowly rises. Therefore, a voltage between input terminals due to the stray capacitance existing between said input terminals of input terminals of each of the semiconductor switching elements on the upper arm side and on the lower arm side does not generate, thus the breakage of the semiconductor switch devices caused by the generation never occurs.

Furthermore, during the regenerating operation of the inverter apparatus, even if the switch devices malfunction and are turned off, since the regenerative energy arrives at the side of inverter apparatus from the electric motor side is absorbed as charged energy by the first smoothing capacitor, the voltage between positive and negative terminals of the inverter 4 does not increase in an instant, accordingly the voltage does not exceed the voltage tolerance of switching elements of the inverter or of the diodes of the converter, and thus the breakage thereof never occurs.

As has been mentioned above, according to the present invention, the inverter apparatus comprises: the converter for converting AC power to DC power; the inverter for inverting the converted DC power to AC power having a predetermined frequency; the first smoothing capacitor between positive and negative buses that connect the output terminal of the converter and the input terminal of the inverter; the first resistor connected in either the positive or negative bus between the converter and the first smoothing capacitor; and the first switch means 16 connected in parallel with the first resistor, wherein the second smoothing capacitor connected in series with the parallel circuit comprising the second resistor and the second switch means connected parallel with each other is connected between the positive and negative buses between the converter and the first switch means, and thus an inrush current limiting device can be constructed by the first and second small switch devices having a small rating current. Accordingly, even in an inverter apparatus having a large rating capacity, switch devices (power relays) in an inrush current preventing device, which have obstructed the miniaturization, can be miniaturized, therefore the inverter apparatus can be miniaturized. Also, no voltage generates between the input terminals of each of the semiconductor switching elements of the inverter at the instant of connection to the AC power line accordingly there is no danger of the breakage of each of the semiconductor switching elements caused by the generation and, moreover, even if the first and second switch devices malfunction and are turned off during the regenerating operation of the inverter apparatus, the voltage between positive and negative terminals of the inverter does not rise in an instant and consequently, there is no danger that the voltage exceeds the voltage tolerance of each semiconductor switching element of the inverter and each rectifying diode of the converter and the breakage thereof occurs.

BRIEF DESCRIPTION OF DRAWINGS

FIG. 3 shows current waveforms of respective portions inside the inverter apparatus according to an embodiment of the present invention.

BEST MODE FOR CARRYING OUT THE INVENTION

Hereinafter, an embodiment of the present invention will be described based on FIG. 1.

Figure 1:
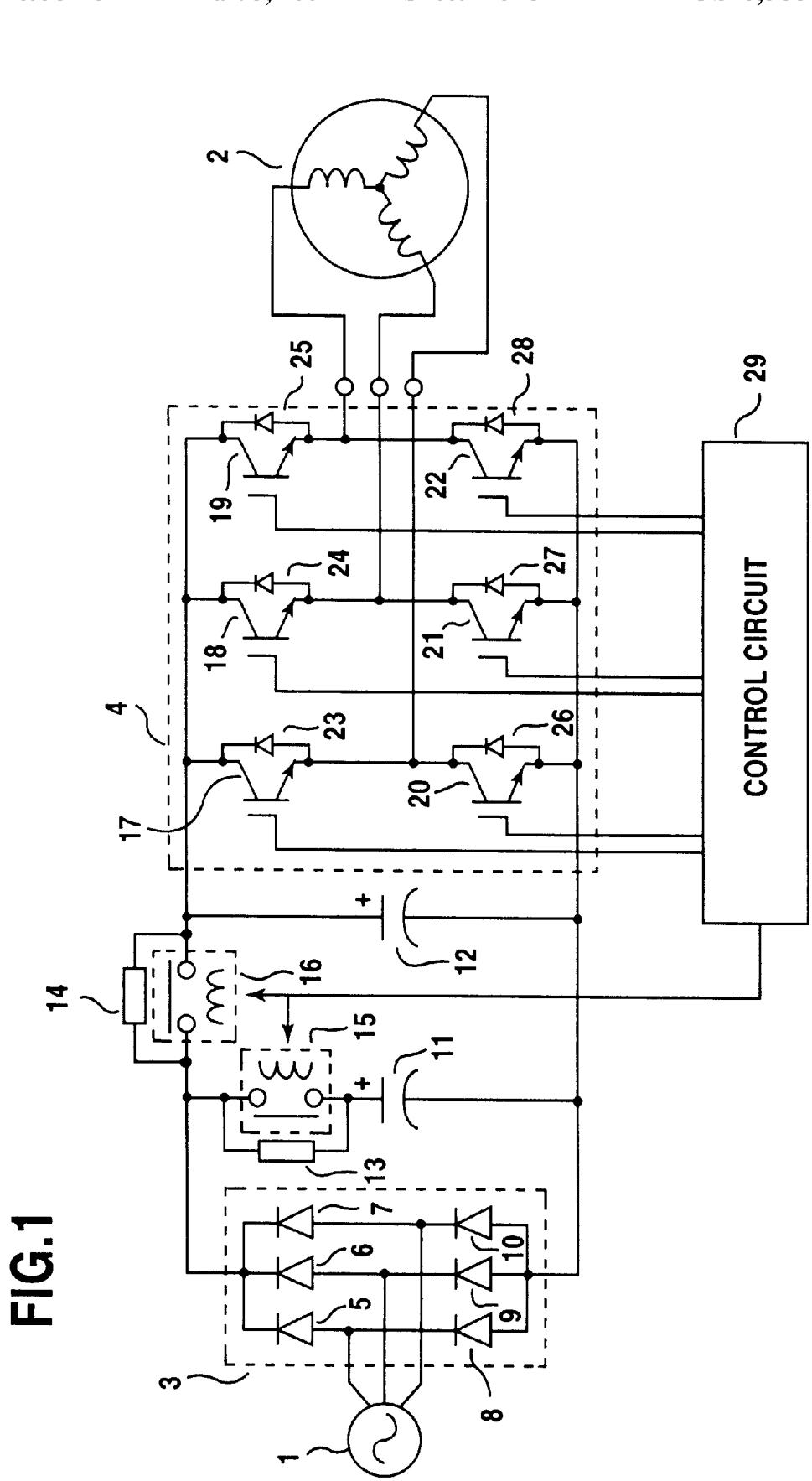
FIG. 1 shows a configurational view of the inverter apparatus provided with the inrush current limiting device according to an embodiment of the present invention.
Figure 2:
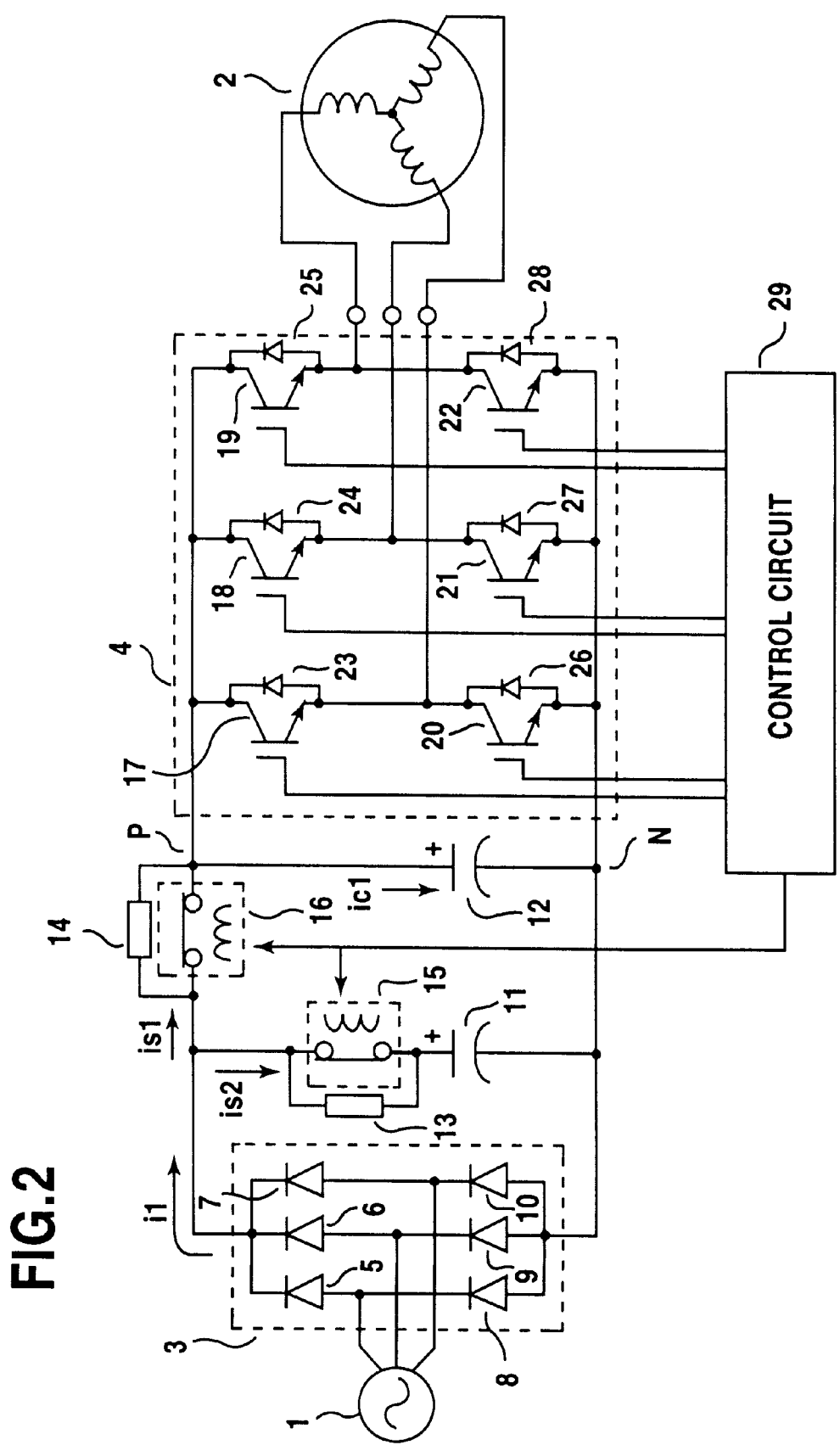
FIG. 2 shows currents of respective portions flowing inside the inverter apparatus according to an embodiment of the present invention.
Figure 4:
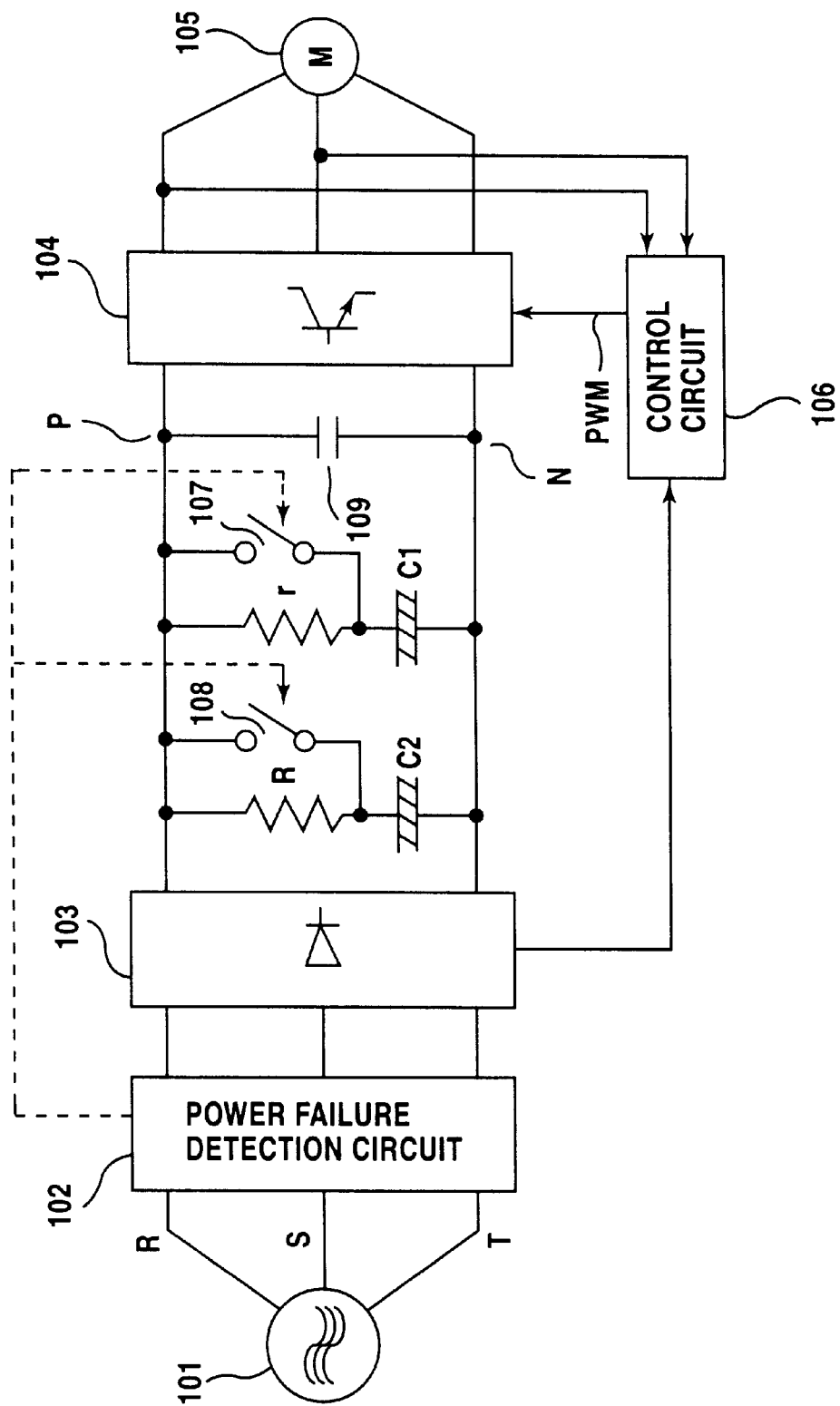
FIG. 4 shows a configurational view of the inrush current limiting device of the power unit according to the prior art.
Figure 5:
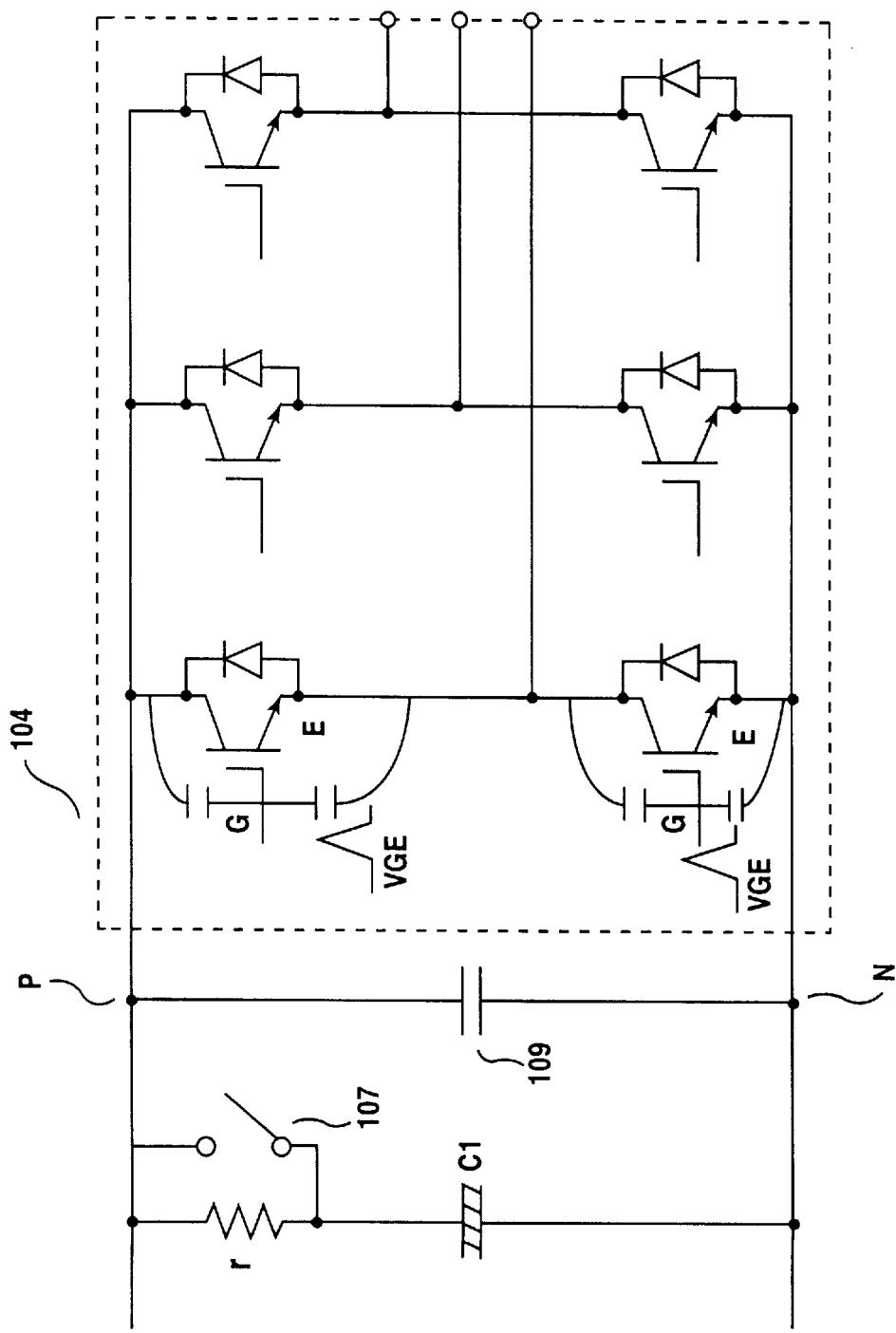
FIG. 5 shows movements of the voltage between gate and emitter (VGE) of the IGBTs at the instant of connection of an inrush current limiting device according to the prior art to the commercial AC power line.

In FIG. 1, a resistance value of the current limiting resistor 14 is determined by setting a charging constant of the smoothing capacitor 12 and a wattage (instantaneous withstanding capacity) is determined by an electrostatic capacity of the smoothing capacitor 12. Also, the opening and closing timing of the bypass contact 16 is controlled by an opening/closing control signal to be supplied from a control circuit 29. Similarly, a resistance value of the current limiting resistor 13 is determined by setting a charging constant of the smoothing capacitor 11 and a wattage (instantaneous withstanding capacity) is determined by an electrostatic capacity of the smoothing capacitor 11. Also, the opening and closing timing of the bypass contact 15 is controlled by an opening/closing control signal to be supplied from a control circuit 29. In the above configuration, both bypass contacts 15 and 16 are opened at the instant of connection to the power line and a charging current for each of the smoothing capacitors from the commercial AC power line 1 flows through the route of the positive output terminal of the converter 3, the current limiting resistors 4 and 13, the smoothing capacitors 12 and 11, and the negative output terminal of the converter 3. After completion of the charging of the smoothing capacitors 12 and 11, the bypass contacts 16 and 15 are closed in response to a closing signal output from the control circuit 29 and the following charging and discharging of the smoothing capacitors 12 and 11 are carried out via the bypass contacts 16 and 15, respectively. During the power outputting operation of the inverter 4, power corresponding to the output power is outputted from the commercial AC power line 1, and currents supplied from this commercial AC power line 1 via the converter 3 of the inverter apparatus respectively flow through the following three routes inside the inverter apparatus and then return via the converter 3 to the commercial AC power line without change.

First, through the first route, the current flows to the bypass contact 16, the smoothing capacitor 12, and the negative terminal of the converter 3 (hereinafter, referred to as "route 1"), then through the second route, the current flows to the bypass contact 15, the smoothing capacitor 11, and the negative terminal of the converter 3 (hereinafter, referred to as "route 2"), and through the third route, the current flows to the bypass contact 16, IGBTs 17 to 19, an electric motor 2, IGBTs 20 to 22, and the negative output terminal of the converter 3 (hereinafter, referred to as "route 3"). Also, as a matter of course, the currents supplied from the commercial AC power line 1 are not consecutive currents, therefore, the energy charged in the smoothing capacitors 11 and 12 is discharged in a time zone where no current is supplied, so that the power outputting operation of the inverter is carried out. The reduced amount of the charged energy of each smoothing capacitor is recharged by a current supplied from the commercial AC power line 1. Since the commercial AC power source employs a three-phase input method, such a charging/discharging operation is repeated at a frequency of six times the commercial frequency.

Then, when the energy charged in the smoothing capacitors 11 and 12 is discharged, a current route from the smoothing capacitor 12, via the IGBTs 17 to 19, the electric motor 2, the IGBTs 20 to 22, and returning to the smoothing capacitor 12 (hereinafter, referred to as "route 4") and a current route from the smoothing capacitor 11 via the bypass contact 15, the bypass contact 16, the IGBTs 17 to 19, the electric motor 2, the IGBTs 20 to 22, and returning to the smoothing capacitor 11 (hereinafter, referred to as "route 5") generate. The current which flows through the bypass contact 16 (the currents through the route 1, route 3, and route 5) is shown by (is1) of FIG. 3 and the current which flows through the bypass contact 15 (the currents through the route 2 and route 5) is shown by (is2) of FIG. 3. Herein, the majority of the effective current of (is1) is the current through the route 1, that is, a charging current for the smoothing capacitor 12 and the whole (is2) is a charge/discharge current of the smoothing capacitor 11. Also, in FIG. 3, (ic1) denotes a charge/discharge current for the smoothing capacitor 12 and (i1) denotes a current supplied from the commercial AC power line 1.

In this embodiment, the increment of the electrostatic capacity of the smoothing capacitor, which is required to increase the output power of the inverter apparatus, is carried out by connecting the smoothing capacitor 11, the current limiting resistor 13, and the bypass contact 15 as shown in FIG. 1, and due to the aforementioned effects of this connection, the current flowing through the bypass contact 16 is increased little (since the majority of this current is the charging current for the smoothing capacitor 12) and the increased capacity can be dealt with as a current flowing through the bypass contact 15 (that is a discharge current of the smoothing capacitor 11). Accordingly, even when the output power of the inverter apparatus becomes large, without increasing the rating current of the bypass contact 16, that is, by the small switch devices comprising the small bypass contacts 16 and 15, an inrush current limiting device can be constructed.

Also, in the present embodiment, since the bypass contact 16 is open when the commercial AC power line is connected, the charging current for the smoothing capacitor 12 is limited by the current limiting resistor 14 and, accordingly, the voltage between terminals of the smoothing capacitor 12, that is the voltage between positive and negative terminals of the inverter 4 slowly rises. Therefore, a voltage between gate and emitter due to the stray capacitance existing between said input terminals of each of the IGBTs 17 to 22 of the inverter 4 does not generate, thus the breakage of each IGBT caused by the generation never occurs.

Furthermore, during the regenerating operation of the inverter apparatus, even if the bypass contacts 15 and 16 malfunction and are turned off, since the regenerative energy arrives at the inverter apparatus from the electric motor 2 is absorbed as charged energy by the smoothing capacitor 12, the voltage between positive and negative terminals of the inverter 4 does not increase in an instant, accordingly the voltage does not exceed the voltage tolerance of each of the IGBTs 17 to 22 of the inverter 4 and each of rectifier diodes 5 to 10 of the converter 3, and thus the breakage thereof never occurs.

INDUSTRIAL APPLICABILITY

As has been described above, the inverter apparatus according to the present invention is especially suitable to be constructed as an inverter apparatus provided with an inrush current limiting device for limiting an inrush current into a smoothing capacitor of a converter at the instant of connection to a commercial AC power line. Furthermore, even when the output power of the inverter apparatus becomes large, since the inrush current limiting device can be constructed by the small switch devices comprising the bypass contacts 16 and 15 having a small rating current, the present invention is suitable for great miniaturization of the inverter apparatus.

What is claimed is:

1. An inverter apparatus comprising: a converter for converting AC power to DC power; an inverter for inverting the converted DC power to AC power having a predetermined frequency; a first smoothing capacitor between positive and negative buses that connect the output terminal of the converter and the input terminal of the inverter; a first resistor connected in either the positive or negative bus between the converter and the first smoothing capacitor; and a first switch means 16 connected in parallel with the first resistor, wherein a second smoothing capacitor connected in series with a parallel circuit comprising a second resistor and a second switch means connected parallel with each other is connected between the positive and negative buses between the converter and the first switch means.

* * * * *